(12) United States Patent
Yu

(10) Patent No.: US 7,764,396 B2
(45) Date of Patent: Jul. 27, 2010

(54) CMOS IMAGE SENSOR HAVING HYBRID PIXEL ARRAYS

(75) Inventor: Young-June Yu, Cranbury, NJ (US)

(73) Assignee: Sarnoff Corporation, Princeton, NJ (US)

( * ) Notice: Subject to any disclaimer, the term of this patent is extended or adjusted under 35 U.S.C. 154(b) by 925 days.

(21) Appl. No.: 11/599,774

(22) Filed: Nov. 14, 2006

(65) Prior Publication Data

US 2007/0133068 A1 Jun. 14, 2007

Related U.S. Application Data

(60) Provisional application No. 60/736,392, filed on Nov. 14, 2005.

(51) Int. Cl.
*G06F 15/00* (2006.01)
*H04N 1/40* (2006.01)

(52) U.S. Cl. .......................... 358/1.2; 358/471

(58) Field of Classification Search .................. 358/1.2, 358/1.6, 1.7, 3.01, 474, 401, 526, 530, 482, 358/483, 493, 494, 296, 301; 356/313, 213, 356/432; 250/370.09, 208.1, 208.2, 226, 250/505.1; 378/4, 7, 9, 15, 19, 98.8, 154, 378/149, 155

See application file for complete search history.

(56) References Cited

U.S. PATENT DOCUMENTS

| | | | |
|---|---|---|---|
| 5,355,309 A * | 10/1994 | Eberhard et al. | 378/15 |
| 6,208,369 B1 | 3/2001 | Oren et al. | |
| 6,512,280 B2 | 1/2003 | Chen et al. | |
| 6,650,727 B2 * | 11/2003 | Kuroda | 378/19 |
| 6,993,110 B2 * | 1/2006 | Hoffman | 378/19 |
| 7,248,358 B2 * | 7/2007 | Geshwind et al. | 356/310 |
| 7,282,709 B2 * | 10/2007 | Darling et al. | 250/299 |
| 7,542,133 B2 * | 6/2009 | Hillis et al. | 356/218 |
| 7,542,540 B2 * | 6/2009 | Matsuda | 378/7 |
| 7,564,940 B2 * | 7/2009 | Mattson et al. | 378/19 |
| 2001/0009440 A1 | 7/2001 | Yang et al. | |

* cited by examiner

*Primary Examiner*—Jerome Grant, II
(74) *Attorney, Agent, or Firm*—Lowenstein Sandler PC

(57) ABSTRACT

Embodiments of the present invention relate to systems and methods for high speed, high resolution imaging, which includes a micropixel array that includes, at least one macropixel, and a macropixel selector module; a micropixel array which is coupled to the macropixel array and includes at least one micropixel, a micropixel selector module, and an analog-to-digital converter; and a global bunch counter.

25 Claims, 6 Drawing Sheets

CMOS IMAGE SENSOR HAVING HYBRID PIXEL ARRAYS

CROSS-REFERENCE TO RELATED APPLICATION

This application claims the benefit of U.S. Provisional Application No. 60/736,392 filed on Nov. 14, 2005, which is hereby incorporated herein by reference.

FIELD OF THE INVENTION

The present invention relates generally to systems and methods for high-speed, high-resolution imaging.

BACKGROUND OF THE INVENTION

Throughout history, scientists have been interested in measuring and characterizing subatomic particles. In modem times, scientists have designed various devices for studying these particles.

One approach has been the use of systems which incorporate pixels to collect and integrate, for example, electron charges or hole charges and convert them into corresponding voltage signals. These detector systems then read out the voltage signal from the pixels that are hit by the particles to obtain information about the particles.

Early detector systems could not read out the signal in time for the next particle's arrival. As a result, the systems could not distinguish among the particles because the signals became mixed.

Scientists circumvented this problem by stopping the system during the readout of a signal from the detector, and then proceeding to the next collision. It normally takes, however, a long time—on the order of several seconds—to read out the signal from the entire pixel array. This stop-and-go method limits the exploration of the particle physics in many ways.

Conventional detectors comprise macropixel arrays adapted to operate at high speeds, but produce low-resolution data. Still other conventional detectors comprise micropixel arrays and provide high resolution data, but read pixel-by-pixel to determine which micropixels contain event data which is time-consuming and inefficient, resulting in low speed imaging.

Thus, there is a need for an imaging system that operates continuously by reading out information only from those pixels which have been hit by the particles. Such a system would make the overall readout speed much faster and quickly complete the readout process and prepare the detector for a subsequent round of collisions, thereby providing high-speed, high-resolution imaging.

SUMMARY OF INVENTION

The above-described problems are addressed and a technical solution is achieved in the art by a system and method that achieves high-speed, high-resolution imaging by providing a macropixel array and an associated micropixel array that communicate with one another to read out only data from micropixels associated with macropixels that have been impacted by one or more particles.

Embodiments of the present invention relate to systems and methods for high speed, high resolution imaging, including detecting an event on a macropixel located in a macropixel array, storing on the macropixel a timestamp and event data associated with the event, detecting an event on a micropixel located in a micropixel array, storing on the micropixel event data associated with the intensity of the event, interrogating the macropixel array to determine a location of the timestamp, identifying a region of interest on the micropixel array which corresponds to the macropixel having the timestamp, wherein the region of interest comprises a plurality of micropixels, integrating event data from the macropixel array with the event data from the corresponding region of interest on the micropixel array to generate integrated data, and reading out the integrated data.

BRIEF DESCRIPTION OF THE DRAWINGS

The present invention will be more readily understood from the detailed description of the embodiments presented below, considered in conjunction with the attached drawings, of which.

DETAILED DESCRIPTION OF THE INVENTION

The present invention relates to an imaging system and method that achieves high-speed, high-resolution imaging by providing a macropixel array and an associated micropixel array that communicate with one another to produce data relating to an event detected by the system. The term "event", as it is used herein, is intended to include the occurrence of an interaction between a particle and the macropixel. The term "particle", as it is used herein, is intended to include but is not limited to, any unit of matter or energy, including but not limited to any molecule, atom, subatomic particle (including but not limited to a proton, neutron, electron or quark), photon, colloid particle, elementary particle, composite particle or point particle. In embodiments of the present invention, an event is detected by both the macropixel array and the micropixel array. The event data generated by the macropixel array is used by a control system to determine a region of interest on the micropixel array. Event data from the micropixel array relating to the intensity of the event is integrated with event data from the macropixel array relating the time and x, y location of the event to generate integrated event data. The integrated event data is read out from the control system and output to a camera or other device capable of reading the data. The term "event data", as it used herein, includes information concerning the impact of the particle upon the hybrid detector 100 according to embodiment of the present invention and includes, but is not limited to, any imaging data or characteristic storable in a pixel such as, for example, the position and intensity associated with the impact of the particle, i.e., event.

Figure 1:
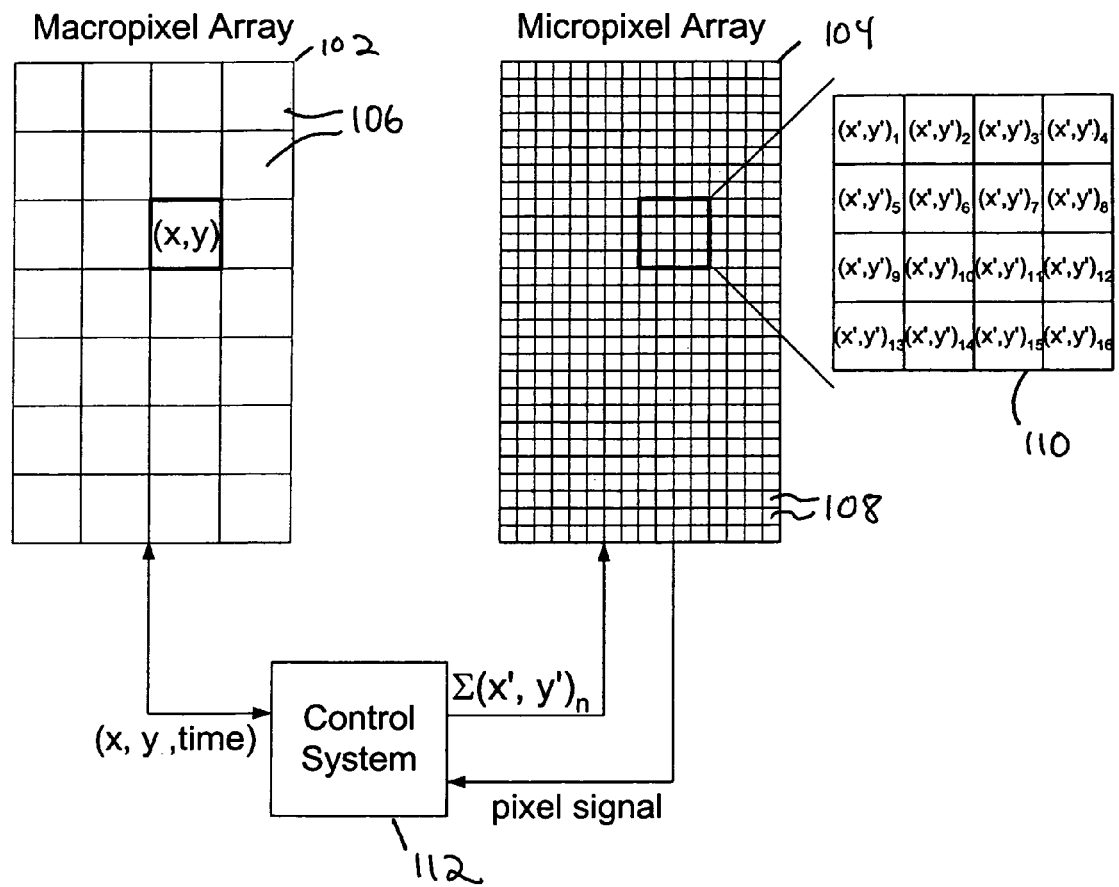
FIG. 1 is an illustration of an exemplary hybrid detector system, according to embodiments of the present invention.

FIG. 1 illustrates an overview of the hybrid detection system 100 according to an embodiment of the present invention. The detection system includes a macropixel array 102 comprising one or more macropixels 106 and an associated micropixel array 104 comprising one or more micropixels 108. Further, the system includes a control system 112 that integrates event data generated by the macropixels 106 and the micropixels 108. According to embodiments of the present invention, a macropixel 106 on the macropixel array detects an event and conveys the time and position of the event to a control system 112. The control system 112 determines a "region of interest" on the micropixel array 104. As it is used herein, the term "region of interest" is intended to a include a region on the micropixel 108 which corresponds to the macropixel 106 that detected the event. The control system 112 collects intensity data from the region of interest on the micropixel array 104 and generates event data.

Figure 2A:
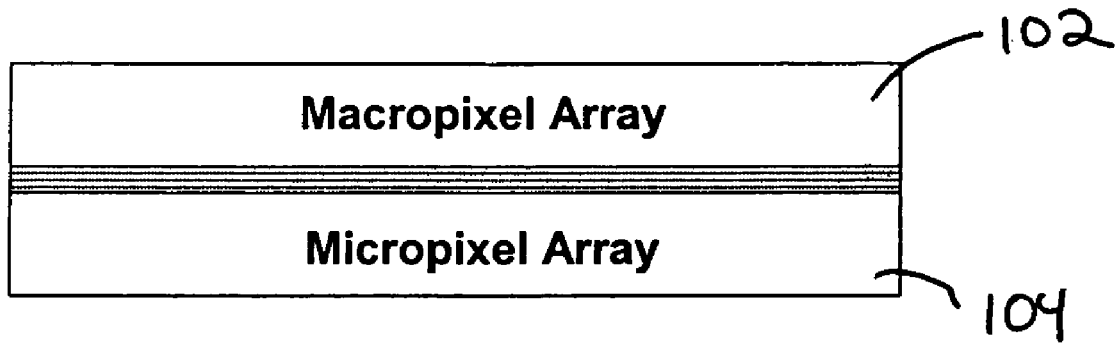
FIGS. 2A and 2B is a side view of a hybrid sensor having a micropixel array bonded to a micropixel array, according to embodiments of the present invention.
Figure 2B:
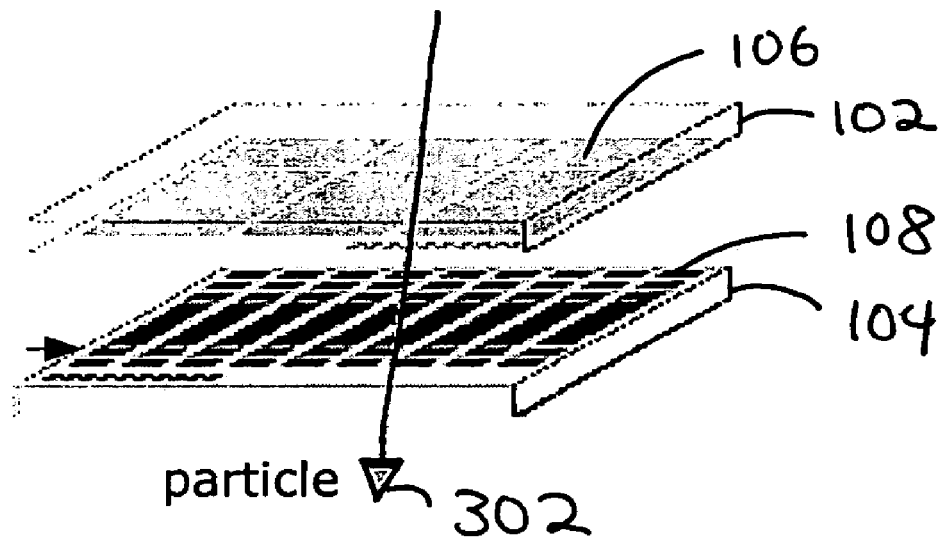

FIG. 2A and 2B illustrate that two sensor arrays, a macropixel array 102 and a micropixel array 104 are bonded and are impacted by one or more particles 302 that impact the macropixel array 102. One having skill in the art will understand that any suitable bonding method and bonding material may be used in accordance with the present invention. For example, the arrays may be bonded by welding, adhesive glues, interlocking parts, electrostatic forces, etc.

With respect to the macropixels in the macropixel array, in some embodiments of the present invention, the individual macropixels 106 may be on the order of approximately 1-1000 micrometers. Due to their relatively large size, these macropixels 106 provide low-resolution imaging. However, the macropixel array 102 according to embodiments of the present invention is structured such that it may be scanned, interrogated or read out at high speed and to output digital information relative to individual particles 302 striking the macropixel array 102 including data regarding position and time.

With respect to the micropixels in the micropixel array, in some embodiments of the present invention, the individual micropixels 108 may be on the order of approximately 0.01-20 micrometers. Due to their relatively small size, these micropixels 108 provide high-resolution imaging. When a particle 302 strikes the system according to embodiments of the present invention, the micropixel array 104 detects the analog signal proportional to the intensity of the energy of the particle 302.

Figure 3:
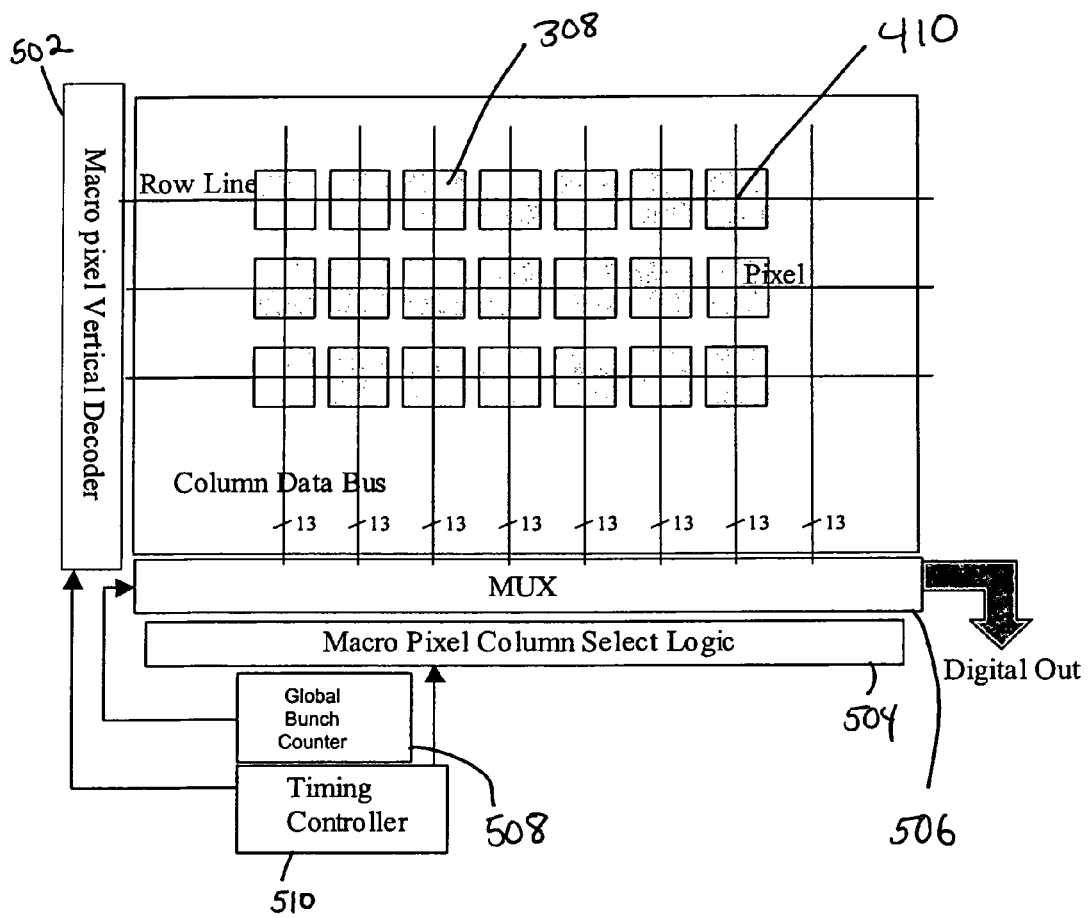
FIG. 3 is an overview of the architecture of a macropixel array according to embodiments of the present invention.

FIG. 3 represents the operation and architecture of a macropixel array 102 according to embodiments of the present invention. The macropixel array 102 comprises a plurality of macropixels 106, a macropixel selector module, a multiplexer (MUX) 506, a global bunch counter 508, and a timing controller 510. The macropixel selector module includes a macropixel row selector (i.e., a macro pixel vertical decoder) 502 and a macropixel column selector (i.e., a macro pixel column select logic) 504. As described below, the macropixel row selector 502 and the macropixel column selector 504 interrogate the macropixel array 102 to determine the location of any macropixel that may contain a timestamp.

First, upon the happening of an event, the bunch counter 508 increments—synchronized by an external strobe pulse—and its digital output supplies the entire pixel array using the macropixel array bus (i.e., column data bus). As it is used herein, the term "bus" is intended to include, but is not limited to, any subsystem that transfers data or power between components within an electronic device or component or between electronic devices or components. If any of the macropixels detect the signal due to the particle hit, then the digital value of global bunch counter 508 is loaded in the digital memory cell array 410. In some embodiments of the present invention, the digital memory array 410 is comprised of plurality of conventional flip-flop circuits 414, which are known to those of skill in the art. This bunch counter 508 value represents the timestamp reflecting the time when the particle 302 hit occurred (i.e., the time of the event). Since the macropixel array bus needs to cover the entire macropixel array 102, the capacitive load becomes very large and the system will drive the macropixel array bus slowly. To circumvent this problem, a buffer circuit is used in embodiments of the present invention at every column of the digital macropixel array 102 to reduce the parasitic capacitance of the macropixel array bus.

Figure 4:
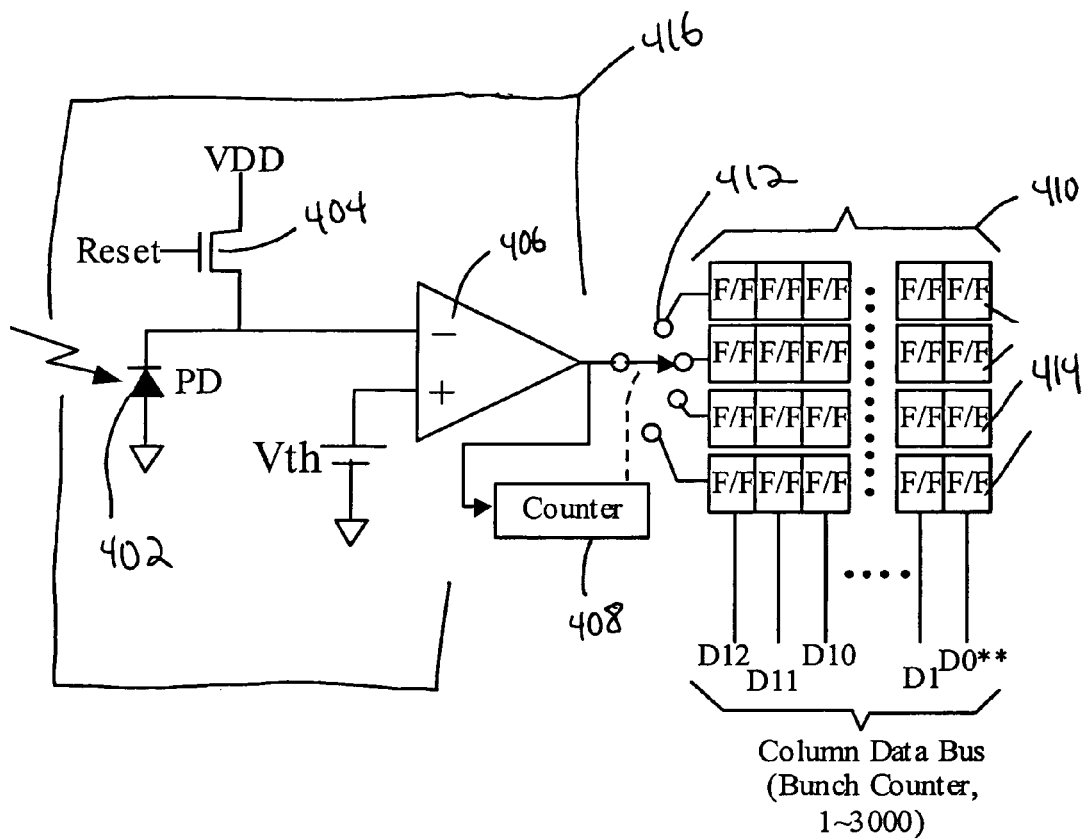
FIG. 4 is an overview of the architecture of a macropixel according to embodiments of the present invention.

Next, the macropixel row selector 502 selects one row line after another synchronized by the timing pulse supplied from timing controller 510. This enables the macropixels 106 to be read out sequentially or randomly. To speed up the readout procedure, the macropixel row selector 502 selects one row of macropixel array 102 and first interrogates the macropixel array 102 to determine whether any of the flip-flops 414 have been written in the macropixel array 102. This operation is a simplified by reading out of the row counter 408 value or a flag signal "empty" that represents the null state of the row counter 408 first in the macropixel array 102. A zero value of the content of the counter or "on" state of the "empty" flag signal implies there has been no event experienced by the macropixel 106 during the last integration time. Then, the macropixel row selector 502 and macropixel column selector 504 skip to next pixel instead of spending time to read out the contents of the empty digital macropixel array 102. This approach reduces the readout time significantly. If a pixel contains a non-zero counter, or "off" state, then it reads out the memory for only those macropixels 106 that experienced an event (i.e., those having a timestamp). If none of the macropixels in the selected row issue the "empty" flag, the macropixel column selector 504 reads out the timestamps sequentially operating multiplexing switches column by column. If a few of the macropixels 106 in the selected row issue an "empty" flag, the macropixel column selector 504 skips the columns where the "empty" flag signal is "on", and stops at the columns where the "empty" flag signal is "off" and read out the timestamp data. If all of the macropixels in the selected row issue the "empty" flag, the macropixel column selector skips entire columns and makes macropixel row selector 502 proceed to next row selection. One having ordinary skill in the art will appreciate that any suitable digital memory device or circuit may be used in accordance with the present invention. As shown in FIG. 4, the exemplary embodiment described herein includes a digital memory comprising a plurality of flip-flop circuits as the memory elements.

In embodiments of the present invention, to store the each set of timestamp data with n-bits, each row of the macropixel array 102 comprises at least $2^n$ memory elements. Additional memory elements can be added for the error checking capability, such as parity check or the cyclic redundancy check (CRC), etc. Latching or writing of timestamp takes places by establishing a connection between the macropixel array bus lines from the global bunch counter 508 output and the memory elements. The global bunch counter 508 output combined with an external strobe pulse enables the switch to connect the macropixel array bus to the memory elements of the corresponding row.

FIG. 4 represents an exemplary macropixel 106 according to an embodiment of the present invention. The macropixel 106 is configured to detect one or more events. As described above, the term "event" refers to the occurrence of an interaction between a particle 302 and the macropixel 106. As discussed in detail below, the macropixel 106 is configured to detect events and stores a timestamp associated with each individual event.

The macropixel 106 comprises an event sensor module 416. According to embodiments of the present invention, the event sensor module includes a macropixel photodiode 402, a reset transistor 404 and a comparator 406. Additionally, the macropixel 106 comprises a binary counter 408 connected to the event sensor module 416, a digital memory cell array 410, and a logic circuit 412 to select and control the digital memory array 410. In other embodiments of the present invention, the digital memory array 410 operates in three modes, including, but not limited to, latch or write mode, hold mode, and read mode. In other embodiments of the present invention the digital memory array 410 operates in less than three modes. In further embodiments of the present invention, the digital memory array 410 operates in more than three modes.

When a particle 302 hits the macropixel 106, the macropixel photodiode 402 collects electrons or holes, depending on the impurity type. Thus, for example, if the photodiode is of the n-type, which is known to those of skill in the art, then electrons are collected in the sensing node. If the signal charge integrated in the macropixel photodiode 402 reaches a threshold level, the comparator 406 output switches from "high" to "low" level, to indicate that an event has occurred. Then, this low signal makes one row of the digital memory array 410 latch the macropixel array bus timestamp input supplied from the global counter circuit 408 in order to load a timestamp associated with the event.

When the latching is completed, macropixel photodiode 402 is reset to VDD voltage, which is known to those of skill in the art, and comparator 406 output becomes "high", disabling the latch mode for the digital memory array 410. The timestamp information thus loaded and saved in the digital memory array 410 can then remain saved.

If a second event is experienced by the same macropixel 106, the binary counter 408 is incremented and its output is used to select the next row of the digital memory array 410, and the new timestamp data associated with the event is loaded into the memory. Thus the macropixel 106 loads a timestamp associated with the second event experienced. This process repeats until the last row of digital memory array 410 completes the latching.

In order to read out the content of the digital memory array 410, the system according to embodiments of the present invention must reset the row counter 408 to zero and enter into the "read" mode. However, before readout of the content of the flip-flops 414 takes place, the row counter 408 contents must be read out first. This method is useful for interrogating the macropixel array 102 at high speed to determine if a given macropixel has been hit by a particle 302. The macropixel array bus is shared for both reading out and writing by time multiplexing method, in other words, reading and writing do not overlap at any time.

Figure 5:
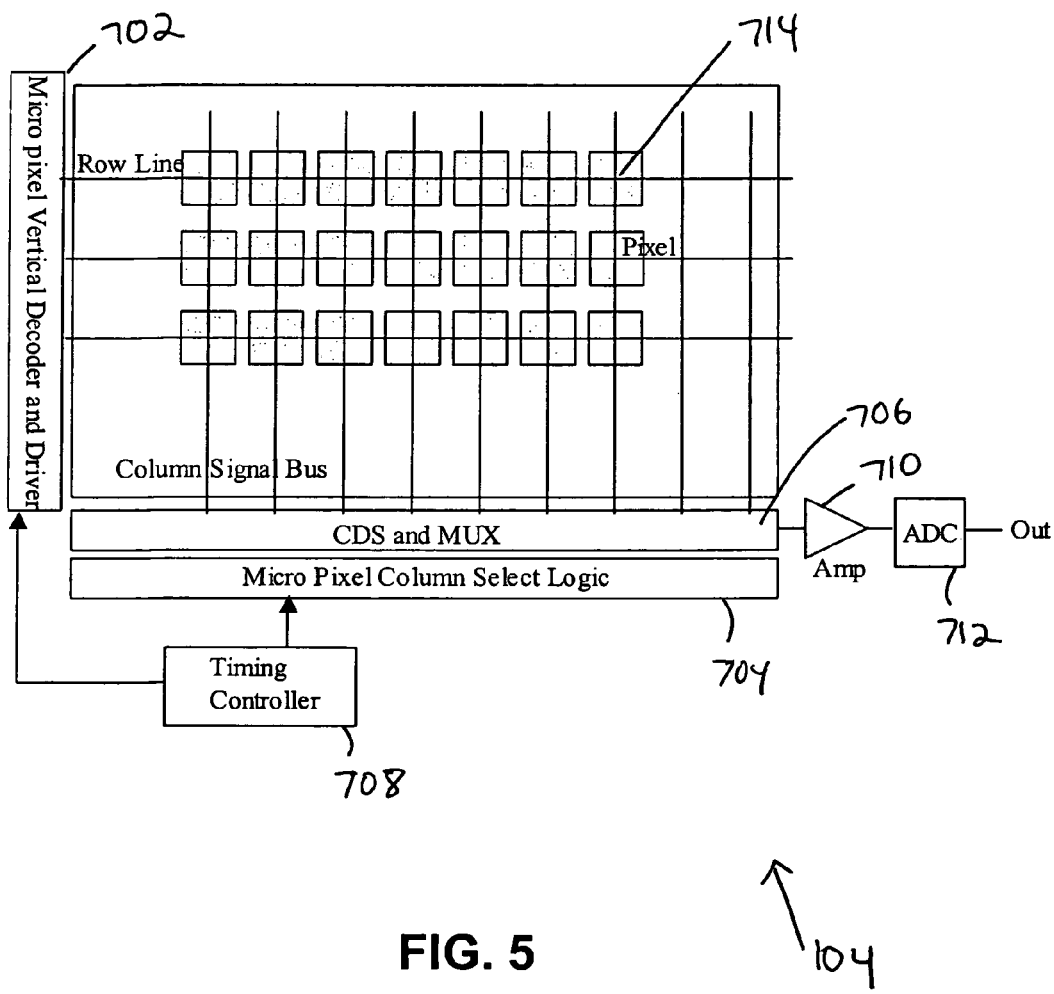
FIG. 5 is an overview of the architecture of a micropixel array according to embodiments of the present invention.

FIG. 5 illustrates the architecture and operation of a micropixel array 104 according to embodiments of the present invention. The micropixel array 104 includes a region of interest 110, which may be defined to include but is not limited to, an area of one or more micropixels 108 on the micropixel array 104 that are associated with one or more macropixels 106 that have been identified as having detected an event.

The architecture of a micropixel array 104 comprises a micropixel selector module, a correlated double sampling (CDS) circuit 706, a timing controller 708, an output amplifier 710, an analog-to-digital converter (ADC) 712, and a two-dimensional micropixel array 714. The micropixel selector module includes a micropixel row selector (i.e., a micro pixel vertical decoder and driver) 702 and a micropixel column selector (i.e., a micro pixel column select logic) 704.

To achieve a random access readout, which is known to those of skill in the art, instead of a time-consuming sequential readout, the macropixel row selector 702 decodes the row select line based on the address information supplied by the timing controller 708. Timing controller 708 transfers this address information from the external controller. The micropixel column selector 704 operates in the same fashion. For example, if a user defines a region of interest having a square or rectangular shape of a window in the image array, timing controller 708 translates the window into the starting address and ending address from the x-coordinate and y-coordinates of the window. Then, the system will use the x-address and y-address to determine the scope of its sweep, which will be performed sequentially or in an interlaced fashion, to readout the micropixels 108 within the window. Thus, a region of interest may, in embodiments of the present invention, be pre-selected by a user.

In embodiments of the present invention, the CDS circuit 706 is used at every column to eliminate fixed pattern noise due to the offset variation. The signal output of the each column's CDS circuit 706 is multiplexed to one micropixel array bus and amplified and digitized by the ADC 712. One having ordinary skill in the art will appreciate that any suitable CDS circuit may be used in accordance with the present invention. On having ordinary skill in the art will appreciate that the macropixel array bus and the micropixel array bus may be the same or different physical components.

Figure 6:
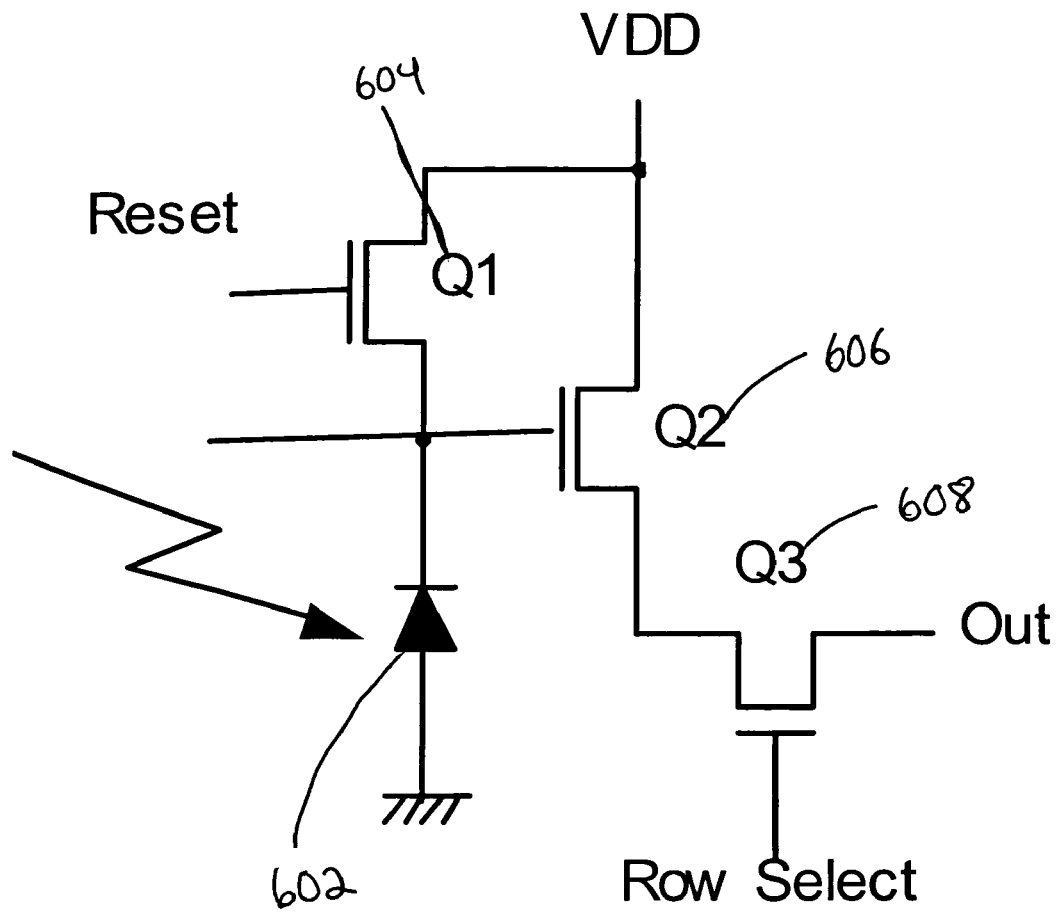
FIG. 6 is an overview of the architecture of a micropixel according to embodiments of the present invention.

FIG. 6 illustrates the architecture and operation of a micropixel 108 according to embodiments of the present invention. As described below, the micropixel 108 stores data related to the intensity of the event. Position or coordinates information of the pixel is obtained from the micropixel row selector and the micropixel column selector 704 of the micropixel array 102.

A micropixel 108 according to embodiments of the present invention comprises a micropixel photodiode 602, a reset transistor 604, a source follower transistor 606 and a row select transistor 608. This architecture is based on the use of conventional pixel architecture to leverage the small pixel's size to achieve high-resolution.

With respect to the operation of the micropixel 108 according to embodiments of the present invention, when particle hits the silicon lattice near the micropixel photodiode 602, electrons and holes are generated. Electrons are collected and potential changes as a function of integrated charges in the photodiode 602. Then, the signal from the micropixel photodiode 602 is read out by the source follower transistor 606 when the row select transistor 608 is enabled. The role of the reset transistor 604 is to reset the photodiode potential to its original state at VDD.

As demonstrated below, the macropixel array 102 and the micropixel array 104 work interactively in embodiments of the present invention to achieve high-speed, high-resolution two-dimensional capture of particle 302 trace.

Referring now to FIGS. 4 and 6, upon impact by a particle 302 on a macropixel 106 according to embodiments of the present invention, the photodiode 402 signal rises above the threshold level and comparator 406 output switches from '1' to '0', enabling the loading of a global timestamp into one row of the digital memory cell array 410. It is to be noted that the designations '1' and '0' are simply used as relative terms and any relative terms or designations may be used in embodiments of the present invention. When the loading the timestamp data in the digital memory cell array 410 is completed, macropixel photodiode 402 resets and comparator output 406 switches back to '1'. Next, upon impact by another particle 302 upon the same macropixel 106, a different timestamp will be loaded into the next row of the digital memory cell array 410.

Upon impact of the particle 302, the micropixel photodiode 602 also integrates the signal charge generated by the impact of the particle 302. However, the charges remain in the micropixel photodiode 602, instead of reading out data or resetting until the end of the bunch train. When another particle 302 hits the same pixel, the charges accumulate in the micropixel photodiode 602 and signal charge quantity increases.

When all particle 302 impacts have ceased for a pre-selected time frame, the macropixel array 102 starts interrogation of each macropixel 106 to determine if there is any timestamp loaded in the digital memory cell array 410.

If a macropixel 102 having a non-zero value on its counter 408 is found, the content of the digital memory cell array 410 is read out. At the same time, current status of the macropixel row selector 502, and the macropixel column selector 504 represent the x, y coordinates of the macropixel 106.

Based on the low resolution x, y coordinates of the macropixel 106, starting and ending addresses of the window are generated to read out high resolution x, y coordinates of the micropixel 108 as well as the intensity of the micropixel signals within the window.

Each of the micropixels 108 are read out, digitized and sent to a camera system or other system or device capable of processing pixel data. Since only a select number of micropixels 108 are read out, high-speed, high-resolution results are achieved. After the micropixel signal is read out, the micropixel photodiode 602 is reset to VDD voltage.

Thus, the hybrid detector system according to embodiments of the present invention combines two different arrays, macropixel arrays 102 and micropixel arrays 104. The macropixel stores the timestamp information associated with an event (i.e., when a particle hits the detector). It includes digital memory cell arrays 410 to store multiple timestamps so that the system can record several events. In embodiments of the present invention the micropixel 108 embedded in the macropixel 106 is based on CMOS APS architecture. Since its size is small, it is capable of yielding high resolution. By combining multiple timestamp capturing capability and high resolution imaging capability, the hybrid pixel system is able to translate the particle events into 3-D information, i.e., x, y coordinates plus time scale. Moreover, the hierarchical architecture according to embodiments of the present invention handles the information in a smart way by decimating unnecessary data at the front end, instead of carrying "garbage" information along during the readout process. This relieves the tremendous bandwidth burden of the system, thereby relaxing the readout speed. This relaxed speed also is beneficial for reducing the power consumption and for improving EMI (electromagnetic interference) robustness.

It is to be understood that the above-described embodiments are merely illustrative of the present invention and that many variations of the above-described embodiments can be devised by one skilled in the art without departing from the scope of the invention. It is therefore intended that such variations be included within the scope of the following claims and their equivalents.

What is claimed is:

1. An apparatus for high-speed, high-resolution imaging for detecting an event, comprising:
 a macropixel array comprising a plurality of macropixels for detecting the event and for locating one of said plurality of macropixels where the event was detected; and
 a micropixel array comprising a plurality of micropixels, each of said macropixels comprising a global bunch counter configured to determine a timestamp of when the event occurred, said micropixel array being bonded to said macropixel array, at least one of said plurality of micropixels of said micropixel array being located within a region of interest of said micropixel array defined by said macropixel and configured to detect a location of the event.

2. The apparatus of claim 1, wherein said at least one of said plurality of micropixels further comprises a first photodiode configured to determine an intensity associated with at least one event.

3. The apparatus of claim 2, wherein said photodiode is configured to collect and integrate charge to produce a potential in response to the at least one event.

4. The apparatus of claim 2, wherein each micropixel of said micropixel array further comprises:
 a source follower transistor electrically coupled to said first photodiode for following said potential of said first photodiode;
 a row select transistor coupled to said source follower transistor for reading out said potential when said row select transistor is enabled; and
 a reset transistor electrically coupled to said photodiode for resetting said first photodiode to its original state.

5. The apparatus of claim 1, wherein each macropixel of the macropixel array further comprises a digital memory cell array for storing said timestamp.

6. The apparatus of claim 5, wherein the digital memory cell array comprises a plurality of flip-flops.

7. The apparatus of claim 5, wherein each macropixel of the macropixel array further comprises:
 a second photodiode;
 a comparator electrically coupled to said second photodiode, said comparator switching state from high to low when said potential collecting on said second photodiode reaches a threshold potential, thereby indicating that an event has occurred; and
 a binary counter that increments in response to said comparator switching state from high to low and for selecting a row in said digital memory cell array for storing said timestamp; and
 a reset transistor electrically coupled to said second photodiode and said comparator for resetting said second photodiode and said comparator to latch said timestamp in said digital memory cell array.

8. The apparatus of claim 7, wherein said comparator is configured to latch a row of said digital memory cell array with the value of said timestamp selected by said binary counter.

9. The apparatus of claim 8, wherein said binary counter is configured to select a subsequent row for storing a subsequent timestamp when said binary counter is incremented.

10. The apparatus of claim 7, wherein the macropixel array further comprises:
 a multiplexor for selecting one of said plurality of macropixels;
 a macropixel row selector coupled to said multiplexor for selecting a row associated with said macropixel;
 a macropixel column selector coupled to said multiplexor for selecting a column associated with said macropixel; and
 a timing controller coupled to said macropixel row selector and said macropixel column selector.

11. The apparatus of claim 10, wherein said macropixel row selector and said macropixel column selector are configured to read out a row of said digital memory cell array if said binary counter indicates a non-zero value.

12. The apparatus of claim 10, wherein said macropixel row selector and said macropixel column selector are configured to define coordinates of region of interest.

13. The apparatus of claim 10, wherein said timing controller is configured to provide a timing pulse for synchronizing a sequential selection of rows by said macropixel column selector.

14. The apparatus of claim 1, wherein said micropixel array comprises:
a multiplexor for selecting a micropixel;
a micropixel row selector coupled to said multiplexor for selecting a row associated with said micropixel;
a micropixel column selector coupled to said multiplexor for selecting a column associated with said micropixel;
a timing controller coupled to said micropixel row selector and said micropixel column selector;
a correlated double sampling circuit coupled to said multiplexor for eliminating fixed pattern noise from each column of micropixels of said micropixel array;
an output amplifier coupled to said correlated double sampling circuit for reading the potential accumulated on said first photodiode; and
an analog-to-digital converter for converting said potential to digital form, said potential being indicative of said intensity associated with the event.

15. The apparatus of claim 14, wherein said timing controller is configured to define a starting address and ending address of micropixels located within the region of interest.

16. The apparatus of claim 1, wherein said macropixel is in the range of about 1-1000 micrometers in size.

17. The apparatus of claim 1, wherein the at least one micropixel is in the range of about 0.01-20 micrometers in size.

18. A method for high-speed, high-resolution imaging for the detection of an event, comprising the steps of:
detecting on a macropixel array comprising a plurality of macropixels the event;
locating a macropixel where the event was detected, said macropixel defining a region of interest on a micropixel array;
detecting a location of the event on at least one micropixel of the micropixel array, the at least one micropixel being located within the region of interest; and
determining a timestamp of when the event occurred.

19. The method of claim 18, further comprising the step of latching the timestamp into a row of a digital memory cell array located on the macropixel.

20. The method of claim 19, further comprising the step of reading out the row of the digital memory cell array if a counter located in the macropixel has a non-zero value.

21. The method of claim 20, further comprising the step of determining the coordinates of the region of interest of the macropixel.

22. The method of claim 21, further comprising the step of, based on the coordinates of the region of interest, determining a starting and ending address of the locations of micropixels within the region of interest.

23. The method of claim 22, further comprising reading out the intensities stored within the micropixels.

24. The method of claim 18, further comprising the step of determining an intensity associated with the event.

25. An apparatus for high-speed, high-resolution imaging for detecting an event, comprising:
a macropixel array comprising a plurality of macropixels for detecting the event and for locating one of said plurality of macropixels where the event was detected; and
a micropixel array comprising a plurality of micropixels, at least one of said macropixels comprising a global bunch counter configured to determine a timestamp of when the event occurred, said micropixel array being bonded to said macropixel array, at least one of said plurality of micropixels of said micropixel array being located within a region of interest of said micropixel array defined by said macropixel and configured to detect a location of the event.

* * * * *